(Model.)
M. McNITT.
COMBINED HARROW AND CORN PLANTER.
No. 264,551. Patented Sept. 19, 1882.
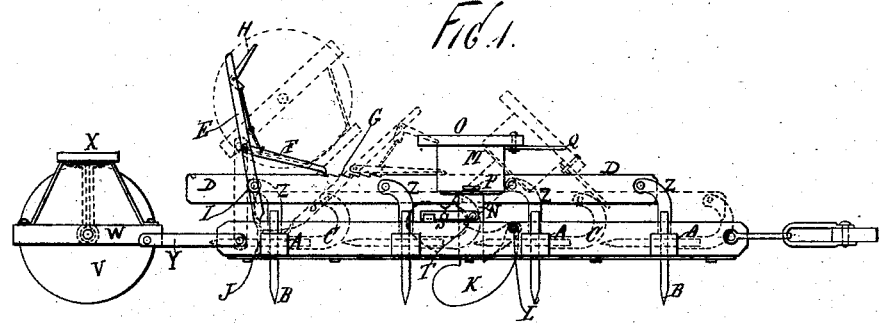
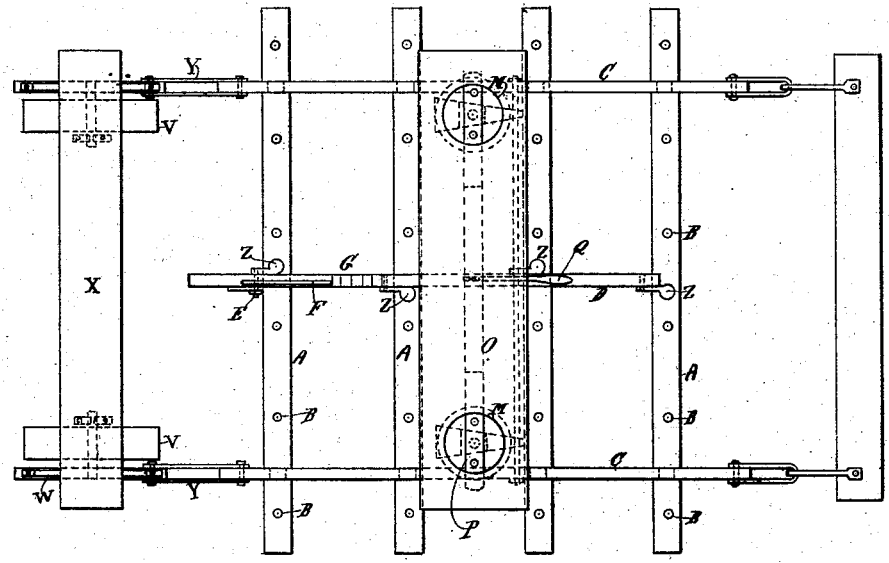
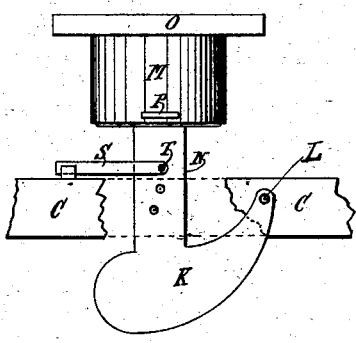
Witnesses
John Trickler
C. Sedgwick
Inventor
M. McNitt
By Munn & Co
Attorneys

UNITED STATES PATENT OFFICE.

MARTIN McNITT, OF WASHINGTON, KANSAS.

COMBINED HARROW AND CORN-PLANTER.

SPECIFICATION forming part of Letters Patent No. 264,551, dated September 19, 1882.

Application filed April 22, 1882. (Model.)

*To all whom it may concern:*

Be it known that I, MARTIN MCNITT, of Washington, in the county of Washington and State of Kansas, have invented a new and Improved Combined Harrow and Corn-Planter, of which the following is a full, clear, and exact description.

This invention relates to certain improvements in combined harrows and planters; and it consists in the special construction, arrangement, and combination of parts hereinafter fully set forth.

Reference is to be had to the accompanying drawings, forming a part of this specification, in which similar letters of reference indicate corresponding parts in all the figures.

Figure 1 is a side elevation of my improved harrow and corn-planter. Fig. 2 is a plan view, and Fig. 3 is a side view of the seed-dropping apparatus in larger size.

A represents the oscillating toothed bars of the harrow, carrying teeth B, and being pivoted in the side bars, C, and connected to the adjusting-bar D, to which the shifting-lever E, attached to one of the bars A at J, is connected at I for setting the teeth upright or obliquely, or for shifting them over flatwise, or nearly so, as indicated by the dotted lines, Fig. 1. When the harrow is to pass over places where it is not required to have the teeth work, the shifting-bar D is connected to oscillating toothed bars A for so shifting them by arms Z. The shifting-lever E has a pawl, F, which regulates the pitch or inclination of the teeth B by shifting along the ratchet G on the adjusting-bar D, and it also has a trip-latch, H, by which to raise the pawl. By shifting the lever E backward at the handle end the bar D, arms Z, and bars A will be moved to cause the teeth B to lean forward, and the extreme forward or opposite movement of the lever will shift the teeth down flatwise, as shown by the dotted lines, Fig. 1, so that the teeth will glide over the ground without taking effect. The reverse or first movement of the lever will shift the teeth up again into the operative position shown by the full lines. By this means the harrow serves to carry the planting attachment in about the same manner as they are carried by the truck-wheels of planters of ordinary construction.

To the harrow so contrived I attach the seed-drills K by pivoting them on the rod L, and I attach the seed-hoppers M to said drills by a tubular standard, N, for supporting them and for conducting the seed from said hoppers into the furrows made by the drills. The hoppers are connected to a cross-plate, O, at the top, forming a seat for the dropper also, and also being a connecting-frame to the drills.

P represents the dropper-slide, which extends from one hopper to the other, and is arranged in the usual way for dropping the seed by shifting forward and backward. It is in this case provided with a hand-lever, Q, for being operated by the attendant sitting on the cross-plate O.

In order to control the drills with respect to the depth of the furrow, and to insure uniformity in hard and soft soils, I provide a spring-stop, S, with each drill-standard N, the said stops being attached to the side bars, C, and having a stop-pin, T, that engages in holes in the side of the standards N, to prevent the drills from rising or falling on the pivots L, the spring-arms S, carrying said stop-pins T, are readily pulled back to detach the pins for shifting into different holes in the drill-standards, and also for allowing the drills and dropping apparatus to be shifted up onto the harrow, as shown by the dotted lines in Fig. 1, to be carried around when not to be operated.

For covering the seed from the dropper so mounted, I connect the riding attachment, consisting of wheels V, frame W, and seat X, to utilize the wheels for rolling, covering, and packing the earth upon the seed, and this I also connect so that it can be shifted upon the harrow, as shown in dotted lines, by means of links Y, thus enabling the harrow to turn short around at the sides of the field.

Having thus described my invention, I claim as new and desire to secure by Letters Patent—

The combination, with the side bars, C, the toothed bars A, pivoted therein, the adjusting-bar D, and shifting-lever E, of the hoppers M, provided with the seed-slides P, the connecting-plate O, the tubular perforated standards N, the drills K, made integral therewith and pivoted to the side bars, C, stops S, and pins T, all arranged and constructed substantially as described, and for the purpose set forth.

MARTIN McNITT.

Witnesses:
THOMAS GROODY,
E. N. EMMONS.